(12) United States Patent
Shirakawa

(10) Patent No.: US 12,008,209 B2
(45) Date of Patent: Jun. 11, 2024

(54) VIRTUAL SPACE MANAGEMENT SYSTEM AND METHOD FOR THE SAME

(71) Applicant: CANON KABUSHIKI KAISHA, Tokyo (JP)

(72) Inventor: Yuki Shirakawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/330,959

(22) Filed: Jun. 7, 2023

(65) Prior Publication Data
US 2023/0400959 A1    Dec. 14, 2023

(30) Foreign Application Priority Data
Jun. 9, 2022    (JP) .................... 2022-093565

(51) Int. Cl.
*G06F 3/04815*    (2022.01)
*G06F 3/01*    (2006.01)

(52) U.S. Cl.
CPC .......... *G06F 3/04815* (2013.01); *G06F 3/011* (2013.01); *G06F 3/017* (2013.01)

(58) Field of Classification Search
None
See application file for complete search history.

(56) References Cited

U.S. PATENT DOCUMENTS

| | | | | |
|---|---|---|---|---|
| 9,443,354 | B2* | 9/2016 | Scavezze | G06F 18/24 |
| 2013/0194164 | A1* | 8/2013 | Sugden | G06T 7/12 |
| | | | | 345/8 |
| 2017/0337352 | A1* | 11/2017 | Williams | G06F 21/32 |
| 2018/0190034 | A1* | 7/2018 | Shapira | G06F 3/011 |
| 2018/0253900 | A1* | 9/2018 | Finding | G06T 19/006 |
| 2020/0143773 | A1* | 5/2020 | Tholfsen | G06V 30/40 |
| 2022/0253136 | A1* | 8/2022 | Holder | G06F 3/011 |
| 2022/0255995 | A1* | 8/2022 | Berliner | G06F 3/04883 |
| 2023/0092103 | A1* | 3/2023 | Puyol | G06F 3/011 |
| | | | | 715/205 |
| 2023/0135420 | A1* | 5/2023 | Lee | G06N 20/00 |
| | | | | 345/156 |
| 2023/0237192 | A1* | 7/2023 | Kahan | G06F 3/011 |
| | | | | 726/1 |

FOREIGN PATENT DOCUMENTS

JP    2022002387 A    1/2022

* cited by examiner

*Primary Examiner* — Asher D Kells
(74) *Attorney, Agent, or Firm* — Canon U.S.A., Inc., IP Division

(57) ABSTRACT

A virtual space management system configured to manage a virtual space in which a plurality of users participates as avatars using client terminals performs control to provide a private content in a display area of a user device object via a client terminal of a second user, based on at least one of a gesture of a first avatar of a first user on both the user device object and a second avatar of the second user in the virtual space, and an operation by the second user in the virtual space.

5 Claims, 9 Drawing Sheets

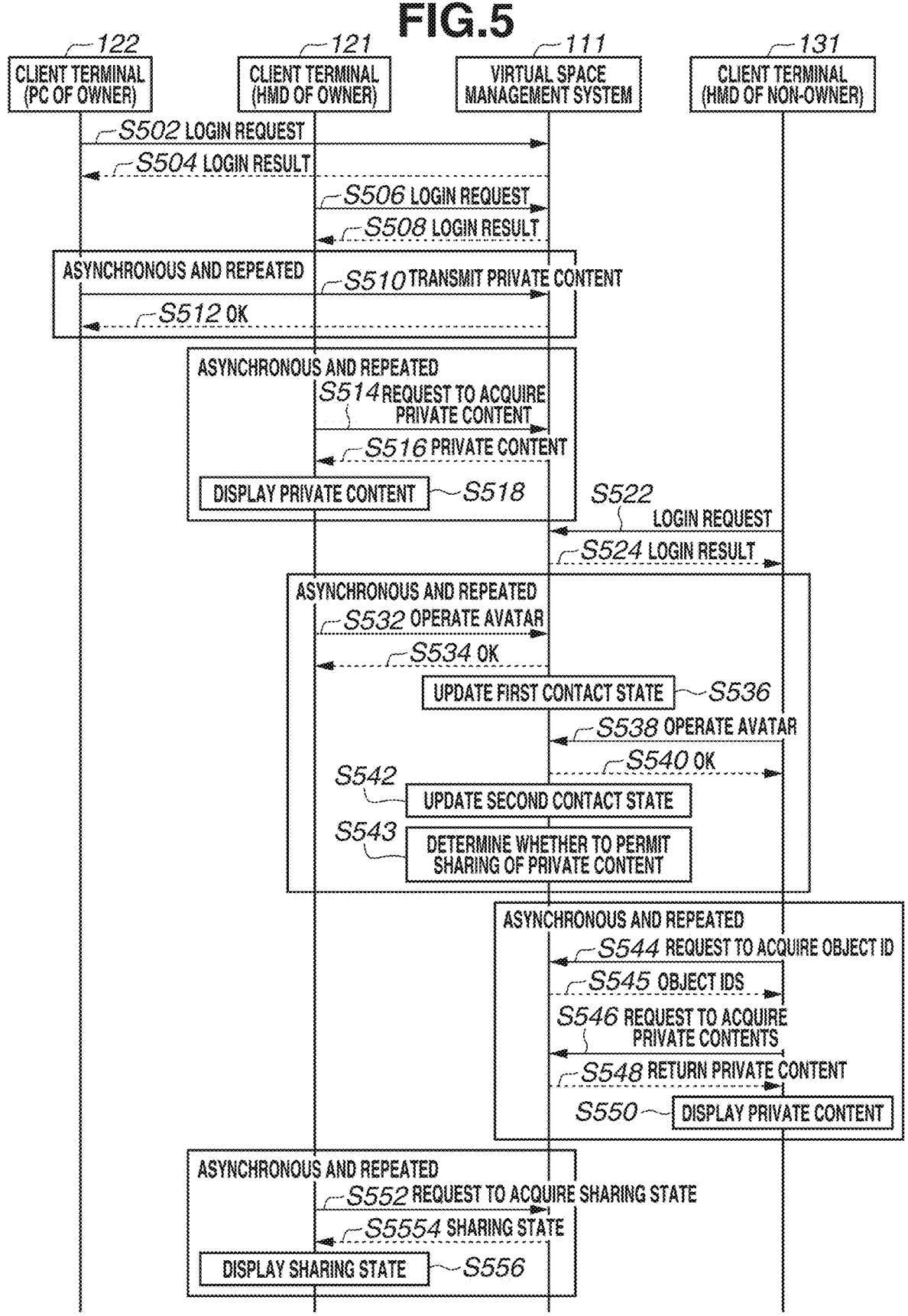

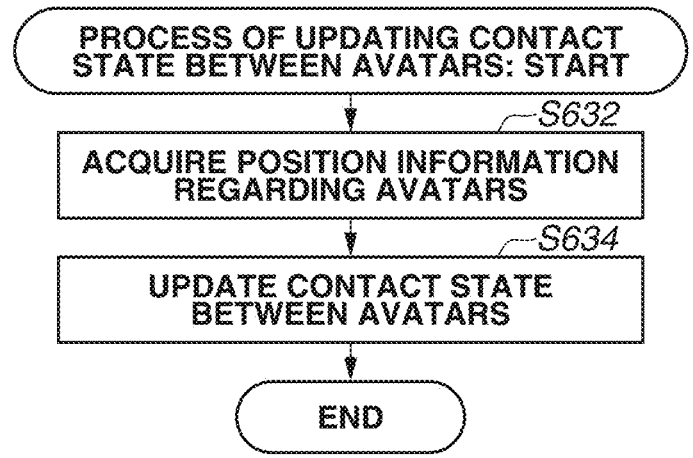
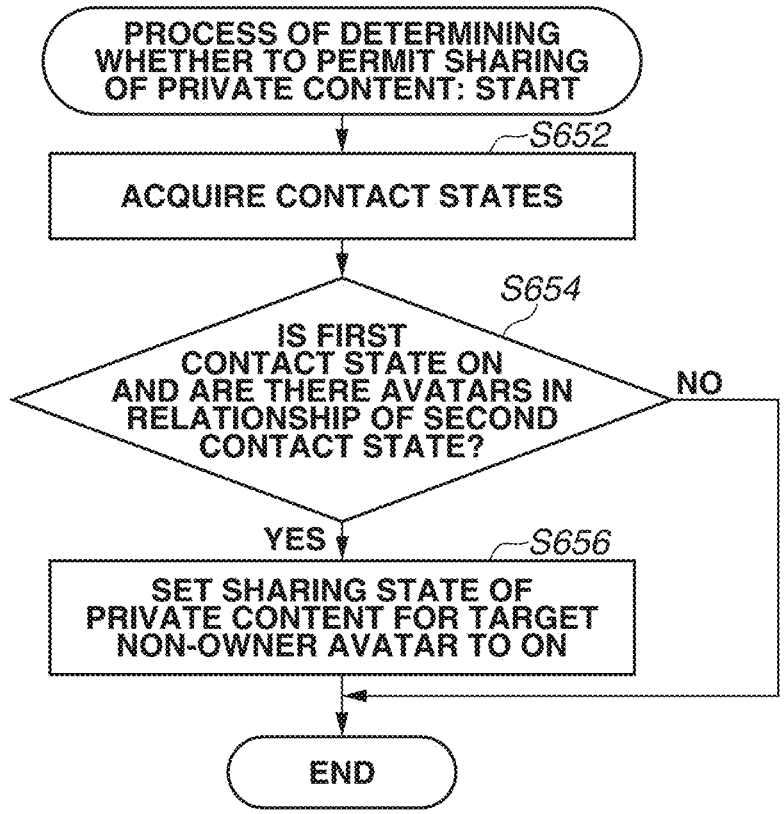

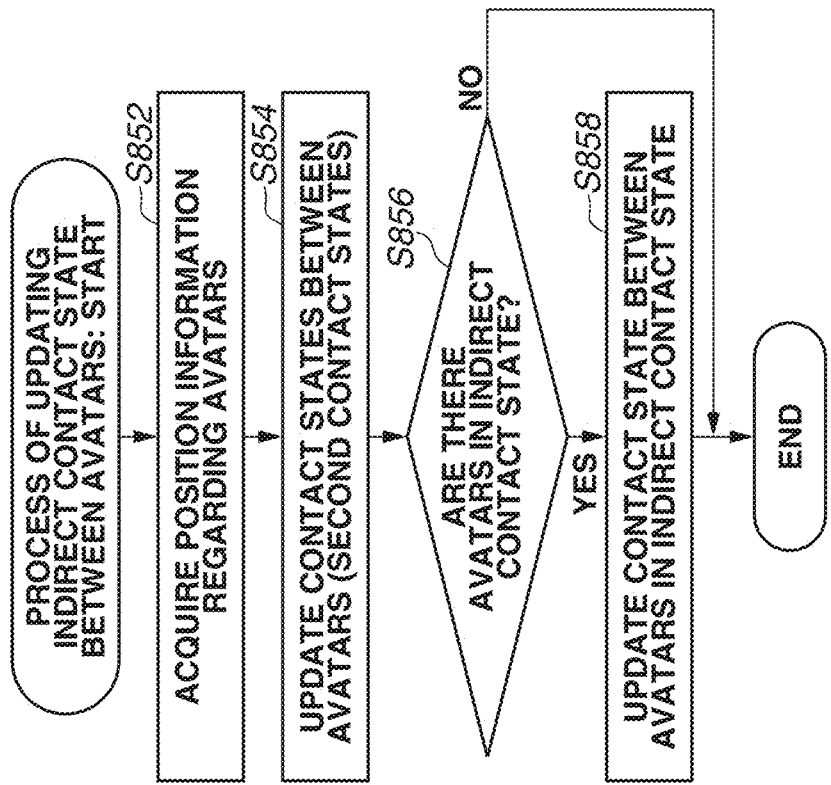
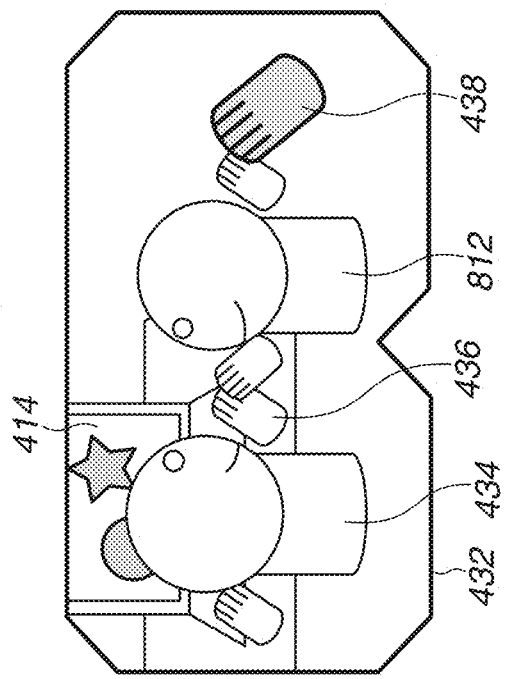
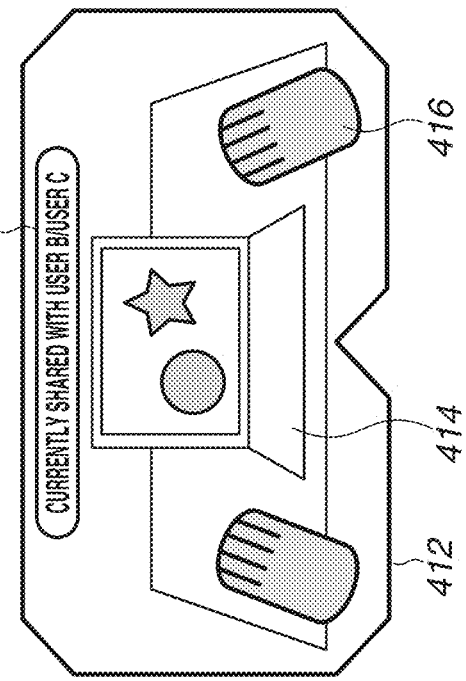

VIRTUAL SPACE MANAGEMENT SYSTEM AND METHOD FOR THE SAME

BACKGROUND

Field

The present disclosure relates to a technique regarding content sharing between avatars in a virtual space of augmented reality (AR) or virtual reality (VR).

Description of the Related Art

Extended reality (XR) is a collective term of a technique for creating a space for providing a simulated experience by fusing reality and a virtual world, such as VR and AR. XR has drawn attention, and the standardization of XR is addressed in various ways.

In recent years, a virtual space or a service using such a technique is termed "metaverse" and used not only for an entertainment purpose, such as a game, but also in a business setting, such as a virtual office or a VR meeting room.

In a virtual office system, workers wear head-mounted displays (HMDs), go to an office in a virtual space as avatars via the HMDs, and work similarly to the conventional real space. Not all the work can be completed in the virtual space, and the workers can proceed with work in the virtual space and the real space in a hybrid manner according to the situation. As a method for this purpose, there is a technique for synchronizing a personal computer (PC) screen in the real space with the virtual space to seamlessly link the virtual space and the real space. A user connects a PC present in the real space to the virtual space and synchronizes the PC screen with their viewpoint in the virtual space, and thereby can have an experience as if the user brought the PC in the real space into the virtual space.

Japanese Patent Application Laid-Open No. 2022-2387 discusses a technique for aiding communication between users in a virtual space. In Japanese Patent Application Laid-Open No. 2022-2387, it can be determined whether a conversation can be held, or the volume of the conversation can be adjusted, according to the distance between avatars in the virtual space. It is thereby possible to improve a user's experience in voice communication with another user in proximity to the user in the virtual space.

In the above case where the user brings the PC screen into the virtual space, another user can view a virtual object corresponding to the PC main body brought into the virtual space, but cannot view a content displayed on the virtual screen of the PC object because the content is private information. However, a case is possible where the user wishes to discuss with another user near the user, such as another user in the periphery of the user's desk in the virtual space, while showing only the other user the PC screen similarly to the case in the real space.

In a case where the user wishes to share the PC screen with another user, the user creates a meeting room as in a conventional online meeting system, then has another user participate in a meeting, and enables the sharing of the screen, and thereby can share the screen. In a case where the user wishes to have an ad-hoc discussion with another user in the periphery of the user's desk while showing the other user the PC screen brought into the virtual space not in a setting such as a meeting, however, the above screen sharing method using the function of the online meeting system is troublesome.

SUMMARY

The present disclosure is directed to providing a mechanism for easily sharing content displayed on a PC screen brought into a virtual space with a user present near a certain user in the virtual space.

According to an aspect of the present disclosure, a virtual space management system configured to manage a virtual space in which a plurality of users participates as avatars using client terminals includes a first provision unit configured to perform control to provide the virtual space via a client terminal of a first user and a client terminal of a second user, and a second provision unit configured to perform control to provide a virtual object in the virtual space. The second provision unit is further configured to perform control to provide, in the virtual space, via the client terminal of the first user and the client terminal of the second user, a user device object owned by the first user, provide, via the client terminal of the first user, private content of the first user in a display area of the user device object, and provide the private content in the display area of the user device object via the client terminal of the second user based on at least one of a gesture of a first avatar of the first user on both the user device object and a second avatar of the second user in the virtual space, and an operation by the second user in the virtual space.

Further features of the present disclosure will become apparent from the following description of exemplary embodiments with reference to the attached drawings.

BRIEF DESCRIPTION OF THE DRAWINGS

FIG. 5 is a sequence diagram until the PC screen brought into the virtual space is shared.

FIGS. 6A to 6C are flowcharts for determining whether to permit the sharing of the PC screen brought into the virtual space.

FIGS. 8A to 8C are diagrams illustrating an example for describing a method for sharing the PC screen brought into the virtual space with a plurality of users in the virtual space.

DESCRIPTION OF THE EMBODIMENTS

Figure 1:
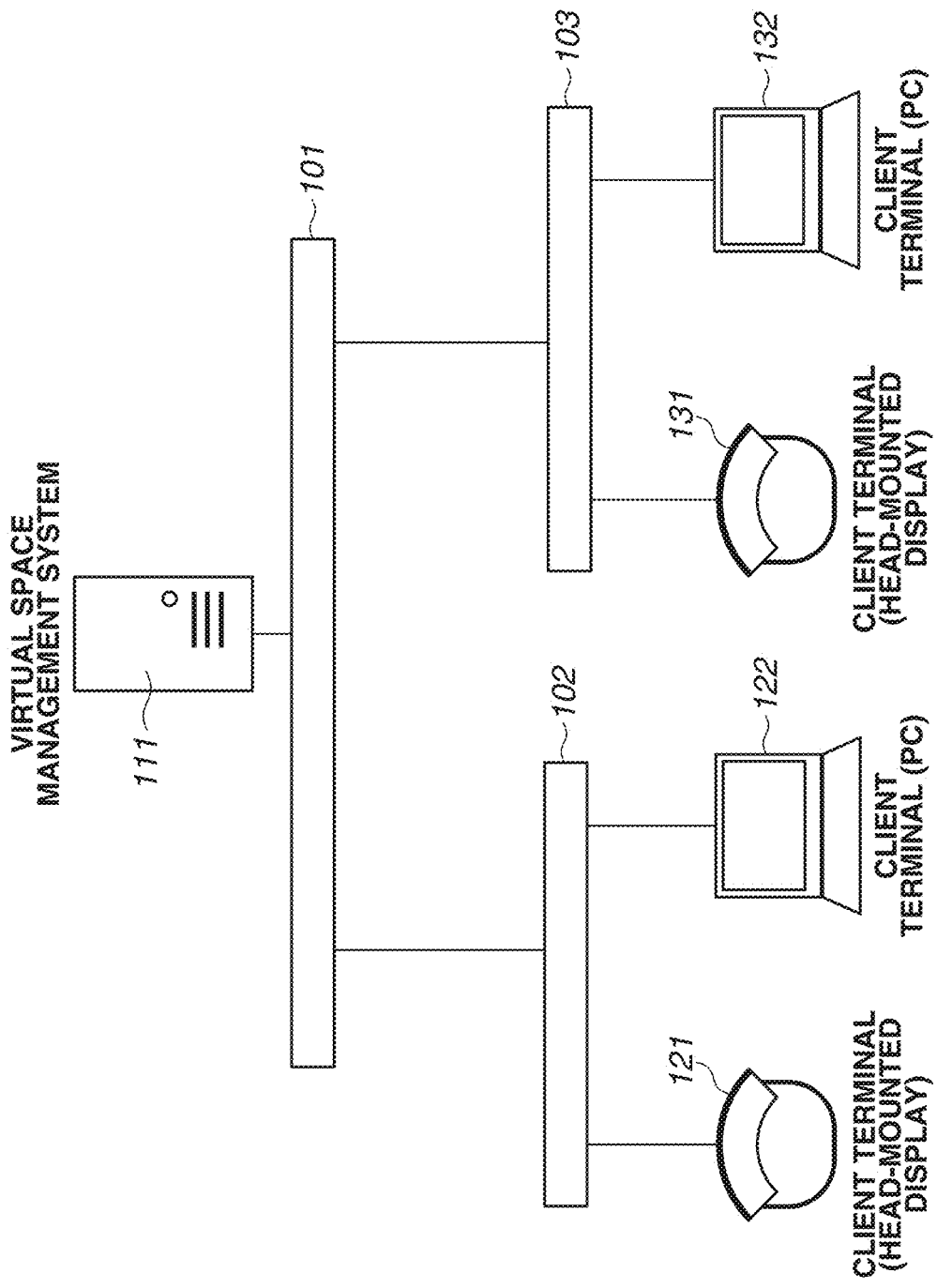
FIG. 1 is a diagram illustrating an example of a configuration of a network.

FIG. 1 is a diagram illustrating an example of the configuration of the entirety of a network system including a virtual space management system according to a first exemplary embodiment. In FIG. 1, a virtual space management system 111, a client terminal 121, a client terminal 122, a client terminal 131, and a client terminal 132 are connected together via networks 101 to 103. The networks 101 to 103 are so-called communication networks achieved by, for example, the Internet, a local area network (LAN), a wide area network (WAN), a telephone circuit, a digital leased circuit, an Asynchronous Transfer Mode (ATM) or frame relay circuit, a cable television circuit, and a data broadcasting wireless circuit. The networks 101 to 103 may only need to enable the transmission and reception of data. In the present exemplary embodiment, the network 101 is the Internet, and each of the networks 102 and 103 is a wireless LAN set for the Internet or a network in a general household or a company.

Each of the client terminals 121 and 131 is dedicated hardware compatible with the drawing of a virtual object handled in extended reality (XR) realized with a head-mounted display (HMD) or smartglasses. Alternatively, each of the client terminals 121 and 131 can be a mobile terminal, such as a smartphone, in which a program execution environment is built-in. Using the client terminals 121 and 131, users can participate as avatars in a virtual space provided by the virtual space management system 111. In the virtual space, avatars of a plurality of users can interact with each other.

Each of the client terminals 121 and 131 includes a camera for capturing the periphery of the client terminal, and a display for projecting or displaying the virtual space and a virtual object placed in the virtual space. Each of the client terminals 121 and 131 recognizes the fingers of the user through the camera and superimposes an action in the real space and an action in the virtual space, thereby providing a simulated experience in which reality and a virtual world are fused together. If each of the client terminals 121 and 131 is not dedicated hardware like a smartphone, the client terminal draws the virtual object using a web browser or an application programming interface (API) provided by an operating system (OS). The present exemplary embodiment is described on the assumption that each of the client terminals 121 and 131 is an HMD.

Each of the client terminals 122 and 132 is a personal computer (PC) and is an information processing apparatus including a display, such as a laptop PC, a desktop PC, or a smartphone. Hereinafter, the client terminals 122 and 132 will be referred to as a "user devices 122 and 132", respectively. Each of the user devices 122 and 132 has the function of transmitting a content displayed on the PC screen to the virtual space management system 111 to bring the PC screen in the real space into the virtual space or to synchronize the PC screen in the real space with the virtual space. Hereinafter, a virtual object representing a PC itself of a certain user in the virtual space will be referred to as a "user device object" owned by the certain user in the virtual space. A content including private information displayed in the display area (PC screen) of the user device object will be referred to as a "private content". In the present exemplary embodiment, another user in the virtual space can view the user device object itself, but cannot normally view the private content displayed on the screen of the user device object.

The virtual space management system 111 is a system for providing virtual objects and avatars simulating the users in the virtual space and position information regarding the virtual objects and the avatars, to the client terminals 121, 122, 131, and 132. The virtual space management system 111 also has the function of receiving and providing a private content transmitted from each of the client terminals 121 and 131 and managing the sharing state of the private content, which is the purpose of the present exemplary embodiment. The virtual space management system 111 also manages the users who use the client terminals 121, 122, 131, and 132. That is, the virtual space management system 111 receives a login/logout request from each of the client terminals 121, 122, 131, and 132 and performs a login/logout process. The virtual space management system 111 is constructed with a server computer, or can be constructed by employing a cloud computing technique. Hereinafter, a virtual object that acts in the virtual space and corresponds to a user will be referred to as an "avatar".

The functions of the virtual space management system 111 according to the present exemplary embodiment can be achieved by a single server or a single virtual server, or can be achieved by a plurality of servers or a plurality of virtual servers. Alternatively, a plurality of virtual servers can be executed on a single server.

Figure 2:
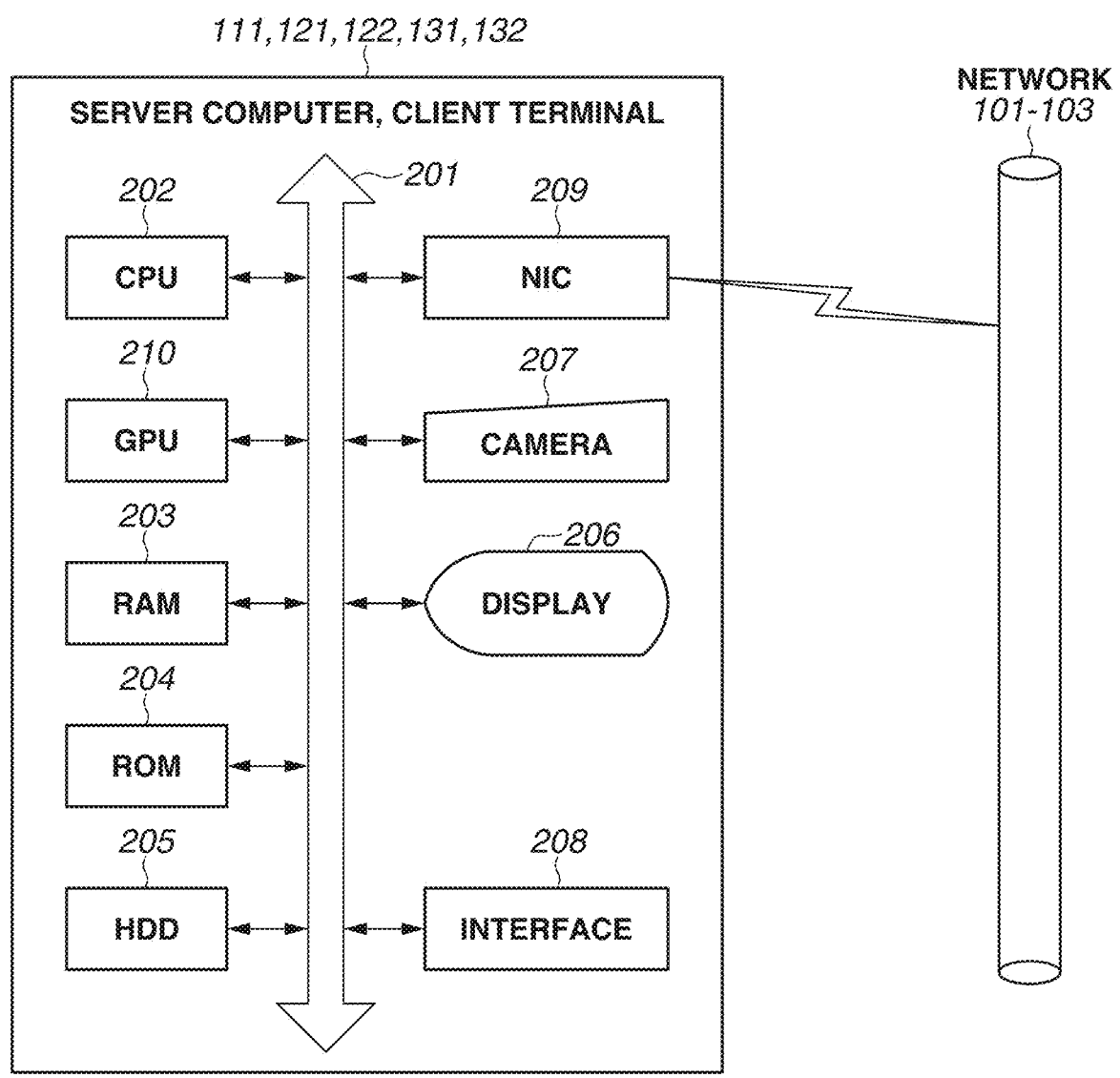
FIG. 2 is a block diagram illustrating an example of a hardware configuration.

FIG. 2 is a hardware configuration diagram of each of the virtual space management system 111 and the client terminals 121, 122, 131, and 132 according to the present exemplary embodiment. In FIG. 2, a central processing unit (CPU) 202 controls the entirety of the apparatus. The CPU 202 performs control to execute an application program and an OS stored in a hard disk drive (HDD) 205 and temporarily store information and a file required to execute a program in a random-access memory (RAM) 203. A graphics processing unit (GPU) 210 performs a calculation process required to draw a virtual object or an avatar in real time. A read-only memory (ROM) 204 is a storage unit and stores inside various pieces of data, such as a basic input/output (I/O) program. The RAM 203 is a temporary storage unit and functions as a main memory and a work area for the CPU 202 and the GPU 210. The HDD 205 is one of external storage units, functions as a large-capacity memory, and stores an application program (e.g., a web browser), a program for a service server group, the OS, and a related program.

A display 206 is a display unit and displays a virtual object or information required for an operation. The display 206 can be a device, such as a touch panel, also having the function of receiving an operation instruction from the user. In each of the client terminals 121 and 131, a camera 207 is a rear camera that captures a video of the periphery of the client terminal, or a front camera that mainly captures the user of the client terminal.

An application program stored in the HDD 205 analyzes a video captured by the camera 207, particularly the rear camera, whereby the user can synchronize the actions of the fingers of the user in the real space and the actions of the fingers of the avatar of the user in the virtual space. The user can also virtually touch a virtual object or another avatar with the synchronized fingers in the virtual space displayed on the display 206. The virtual space management system 111 and the user devices 122 and 132 do not necessarily require the camera 207.

An interface 208 is an external apparatus interface (I/F) and connects to a peripheral device, such as various external sensors. The camera 207 described above recognizes the fingers of the user in the real space, whereby the user can operate a virtual object or come into contact with another avatar in the virtual space. It is, however, also possible to achieve an equivalent function by operating a dedicated controller connected to the interface 208.

A system bus 201 governs the flow of data in the apparatus. A network interface card (NIC) 209 exchanges data with an external apparatus via the NIC 209 and the networks 101 to 103. The configuration of the above computer is merely an example, and is not limited to the example of the configuration in FIG. 2. For example, the storage location of data or a program can be changed among the ROM 204, the RAM 203, and the HDD 205 according to the characteristics of the data or the program. Additionally, processing in a software configuration illustrated in FIG. 3 is achieved by the CPU 202 or the GPU 210 executing processing based on a program stored in the HDD 205.

Figure 3:
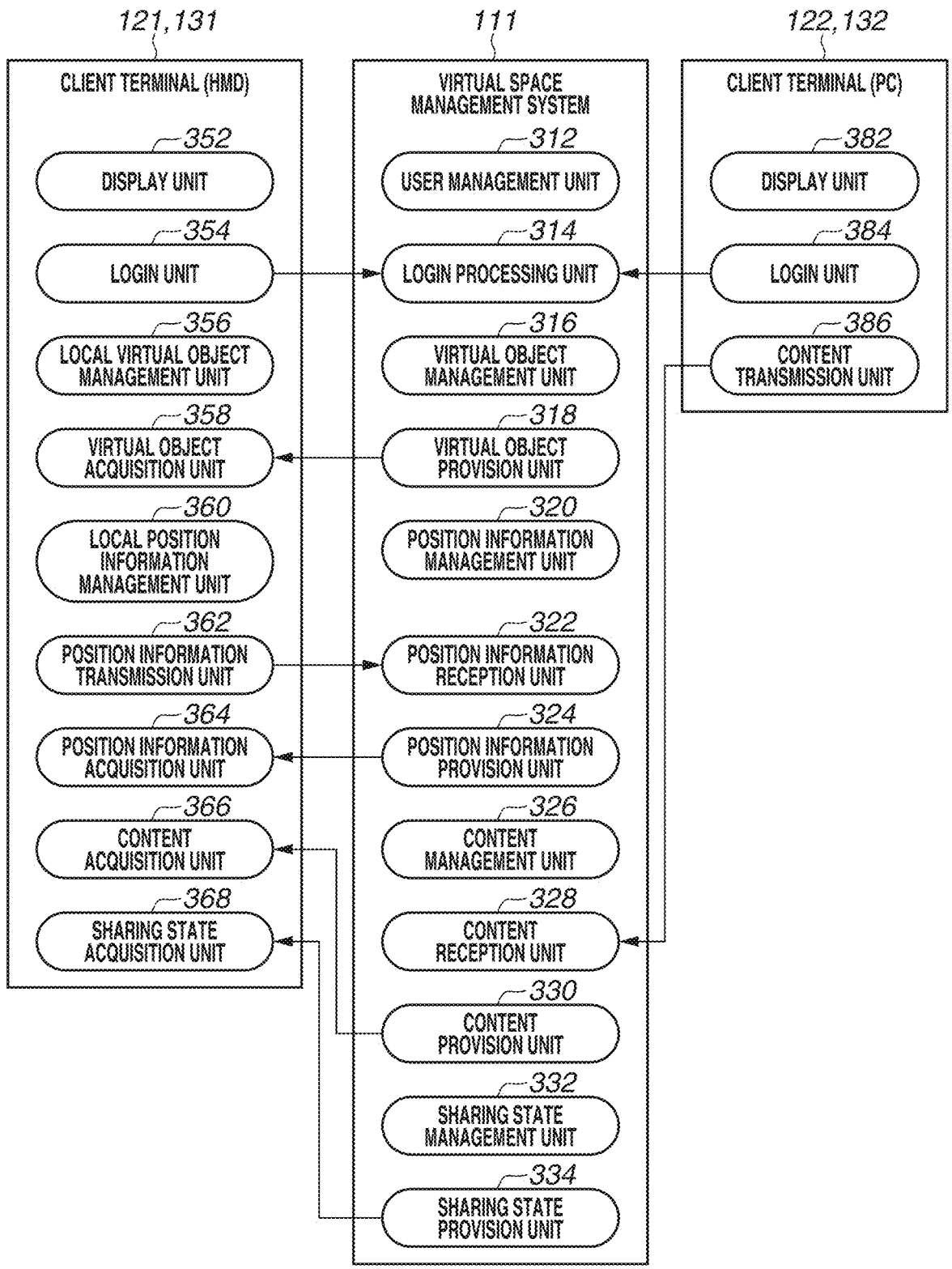
FIG. 3 is a diagram illustrating an example of a software configuration.

FIG. 3 illustrates a software configuration in which functions related to the present exemplary embodiment are excerpted from the virtual space management system 111, the client terminals 121, 122, 131, and 132 according to the present exemplary embodiment.

The virtual space management system 111 includes a user management unit 312 and a login processing unit 314 as user management functions. The virtual space management system 111 also includes a virtual object management unit 316, a virtual object provision unit 318, a position information management unit 320, a position information reception unit 322, and a position information provision unit 324 as basic functions for providing the virtual space.

The virtual space management system 111 also includes a content management unit 326, a content reception unit 328, a content provision unit 330, a sharing state management unit 332, and a sharing state provision unit 334, which are features of the present exemplary embodiment.

The user management unit 312 manages user information and login information. The login processing unit 314 receives a login request from each of the client terminals 121, 122, 131, and 132, checks the login request against the information in the user management unit 312, and returns the result of the login process to each of the client terminal 121, 122, 131, and 132. Table 1 illustrates an example of data managed by the user management unit 312.

TABLE 1

User Management Table

| User ID | Password | Login state | Login expiration date | Object ID |
|---------|----------|-------------|-----------------------|-----------|
| user A | ********** | on | 2022 Dec. 31 0:00 | private A |
| user B | ********** | on | 2022 Dec. 31 0:00 | |
| user C | ********** | off | | |

A "user ID" column describes an identifier (ID) for uniquely identifying a user. A "password" column describes a password for basic authentication used when a login is performed using a user ID. The login processing unit 314 checks the combination of a user ID and a password included in a login request from each of the client terminals 121, 122, 131, and 132 against table 1. If the combination matches table 1, the login processing unit 314 returns a login result indicating success to the client terminal. A "login state" column describes the login state of a user. "On" indicates a logged-in state, and "off" indicates a logged-out state. A "login expiration date" column describes the expiration date of the authentication state of a logged-in user.

An "object ID" column describes a unique ID randomly assigned in a case where a user device object as a target is present in the virtual space, i.e., in a case where each of the user devices 122 and 132 (the PCs) is brought into the virtual space as a virtual object.

The virtual object management unit 316 manages three-dimensional (3D) data of the virtual objects and the avatars of the users placed in the virtual space. The virtual object provision unit 318 provides the 3D data managed by the virtual object management unit 316 to each of the client terminals 121 and 131.

The position information management unit 320 manages position information regarding the virtual objects and the avatars managed by the virtual object management unit 316. Table 2 illustrates an example of the position information regarding the avatars of the users managed by the position information management unit 320.

TABLE 2

Avatar Position Information Management Table

| User ID | Space ID | Main coordinates | Left hand coordinates | Right hand coordinates |
|---------|----------|------------------|-----------------------|------------------------|
| user A | room A | (100, 100, 5) | (100, 98, 5) | (100, 102, 5) |
| user B | room A | (100, 104, 5) | (100, 102, 5) | (100, 106, 5) |
| user C | | | | |

A "user ID" column describes an ID for uniquely identifying a user. A "space ID" column describes an ID for uniquely identifying a virtual space. A "main coordinates" column describes information indicating the current position (center of gravity) of an avatar. A "left hand coordinates" column and a "right hand coordinates" column describe information indicating the positions of the left hand and the right hand of an avatar, respectively. The "left hand coordinates" column and the "right hand coordinates" column are used to determine a contact state with a virtual object or an avatar. The details of the contact state will be described below.

Similarly to table 2, table 3 illustrates an example of the position information regarding the virtual objects.

TABLE 3

Virtual Object Position Information Management Table

| Virtual object ID | Space ID | Main coordinates |
|-------------------|----------|------------------|
| private A | room A | (99, 100, 5) |
| public B | room A | (1, 2, 3) |
| public C | room A | (998, 999, 1000) |

A virtual "object ID" column describes an ID for uniquely identifying a virtual object in the virtual space. A "space ID" column and a "main coordinates" column are similar to those described in table 2.

The position information reception unit 322 has the function of, in a case where the position of a virtual object or an avatar in the virtual space are changed by an operation from each of the client terminals 121 and 131 or periodically, receiving position information from each of the client terminals 121 and 131. The position information provision unit 324 provides the position information regarding the virtual objects and the avatars in the virtual space managed by the position information management unit 320 to each of the client terminals 121 and 131.

The content management unit 326 manages a private content transmitted from each of the user devices 122 and 132. The content reception unit 328 receives a private content transmitted from each of the user devices 122 and 132. The content provision unit 330 provides a private content to each of the client terminals 121 and 131 corresponding to an avatar permitted to share the private content. The details will be described below.

The sharing state management unit 332 manages data for determining whether to permit the sharing of a private content, which is a feature of the present exemplary embodiment. Table 4 illustrates an example of the data managed by the sharing state management unit 332.

TABLE 4

Sharing State Management Table

| User ID | Contact with user device object | Contact user | Sharer user |
|---|---|---|---|
| user A | on | user B | user B |
| user B | | user A | |
| user C | | | |

A "user ID" column describes an ID for uniquely identifying a user. A "contact with user device object" column describes whether an owner of a user device object in the virtual space is in contact with the user device object owned by the owner themselves. A "contact user" column describes the user ID of an avatar with which a user is in contact in the virtual space. A "sharer user" column describes the user ID of a sharer of a private content. The details of a contact determination and a sharing permission determination will be described below with reference to other figures.

The software configuration of each of the client terminals 121 and 131 will now be described.

Each of the client terminals 121 and 131 includes a display unit 352, a login unit 354, a local virtual object management unit 356, and a virtual object acquisition unit 358. Each of the client terminals 121 and 131 also includes a local position information management unit 360, a position information transmission unit 362, a position information acquisition unit 364, a content acquisition unit 366, and a sharing state acquisition unit 368.

The display unit 352 projects or displays a virtual object or an avatar in the virtual space via the display 206. The login unit 354 transmits a user name and a password input using fingers captured by the camera 207 or an input device connected to the interface 208 to the login processing unit 314. An authentication method for the virtual space management system 111 can be face authentication based on a face image captured by the camera 207, iris authentication based on irises, or fingerprint authentication using a fingerprint sensor connected to the interface 208.

The local virtual object management unit 356 manages information, such as 3D data of a virtual object or an avatar, acquired from the virtual space management system 111 on each of the client terminals 121 and 131. The virtual object acquisition unit 358 acquires information, such as 3D data of a virtual object or an avatar, from the virtual object provision unit 318 and saves the information in the local virtual object management unit 356.

The local position information management unit 360 manages the position information regarding the virtual objects and the avatars in the virtual space illustrated in tables 2 and 3 that is acquired from the virtual space management system 111. The local position information management unit 360 also has the function of, in a case where the position of a virtual object or an avatar changes by an operation on each of the client terminals 121 and 131, detecting the position of the virtual object or the avatar in the terminal and saving the position information regarding the virtual object or the avatar in the local position information management unit 360 itself.

In a case where position information in the virtual space changes by an operation on each of the client terminals 121 and 131 or periodically, the position information transmission unit 362 transmits the position information regarding a virtual object or an avatar to the position information reception unit 322. The position information acquisition unit 364 periodically acquires position information regarding a virtual object or an avatar from the position information provision unit 324 and saves the position information in the local position information management unit 360. By using the functions of the units 352 to 364, it is possible to reflect the behavior or the state of a virtual object or another avatar in the virtual space provided by the virtual space management system 111 on the display 206 in real time.

The content acquisition unit 366 and the sharing state acquisition unit 368 are some of components as features of the present exemplary embodiment for sharing a private content with another avatar. In a case where the user is permitted to share a private content as a sharer user of the private content (in a case where the user is described in the "sharer user" column in table 4), the content acquisition unit 366 acquires the private content from the content provision unit 330. The display unit 352 then maps the private content acquired by the content acquisition unit 366 on a user device object placed in the virtual space, whereby it is possible to perform control so that the user feels as if the user viewed a PC screen in the real space in the virtual space. In a case where a private content of the user of the client terminal is in a sharing state, the sharing state acquisition unit 368 acquires the sharing state of the private content illustrated in table 4 from the sharing state provision unit 334. Information regarding the sharing state that can be acquired by the sharing state acquisition unit 368 is used to grasp which avatar an owner of a private content shares the private content with. Alternatively, the information is also used to determine which private content a sharer user is to acquire.

Finally, the software configuration of each of the user devices 122 and 132 will now be described. Each of the user devices 122 and 132 includes a display unit 382, a login unit 384, and a content transmission unit 386.

The display unit 382 displays a content on the display 206 of each of the user devices 122 and 132 (the PCs) in the real space. Similarly to the login unit 354, the login unit 384 transmits a user name and a password input using an input device connected to the interface 208 to the login processing unit 314. The content transmission unit 386 periodically transmits a content displayed on the PC screen of each of the user devices 122 and 132 in the real space to the content reception unit 328.

The content transmission unit 386 executes the process of transmitting a private content to the content reception unit 328, and the content acquisition unit 366 periodically executes the process of acquiring a private content from the content provision unit 330. In this manner, each of the client terminals 121 and 131 can also reference a content that can normally be referenced from only each of the user devices 122 and 132. Although this is obvious, the private content can be acquired regardless of the sharing state, if a logged-in user of a client terminal that transmits a private content and a logged-in user of a client terminal that acquires the private content are the same as each other. If the client terminals 121, 122, 131, and 132 can locally communicate with each other via the interfaces 208, the client terminals 121, 122, 131, and 132 can also transmit and receive a private content not via the virtual space management system 111.

With reference to FIGS. 4A to 4D, 5, and 6A to 6C, a description will now be given of a method for an avatar of a user to share a private content with an avatar of another user near the avatar of the user in the virtual space.

Each of FIGS. 4A to 4D illustrates a video of the inside of the virtual space displayed on the display 206 of each of the client terminals 121 and 131 and an example of the gesture of each avatar for sharing a private content according to the present exemplary embodiment.

Figure 6A:
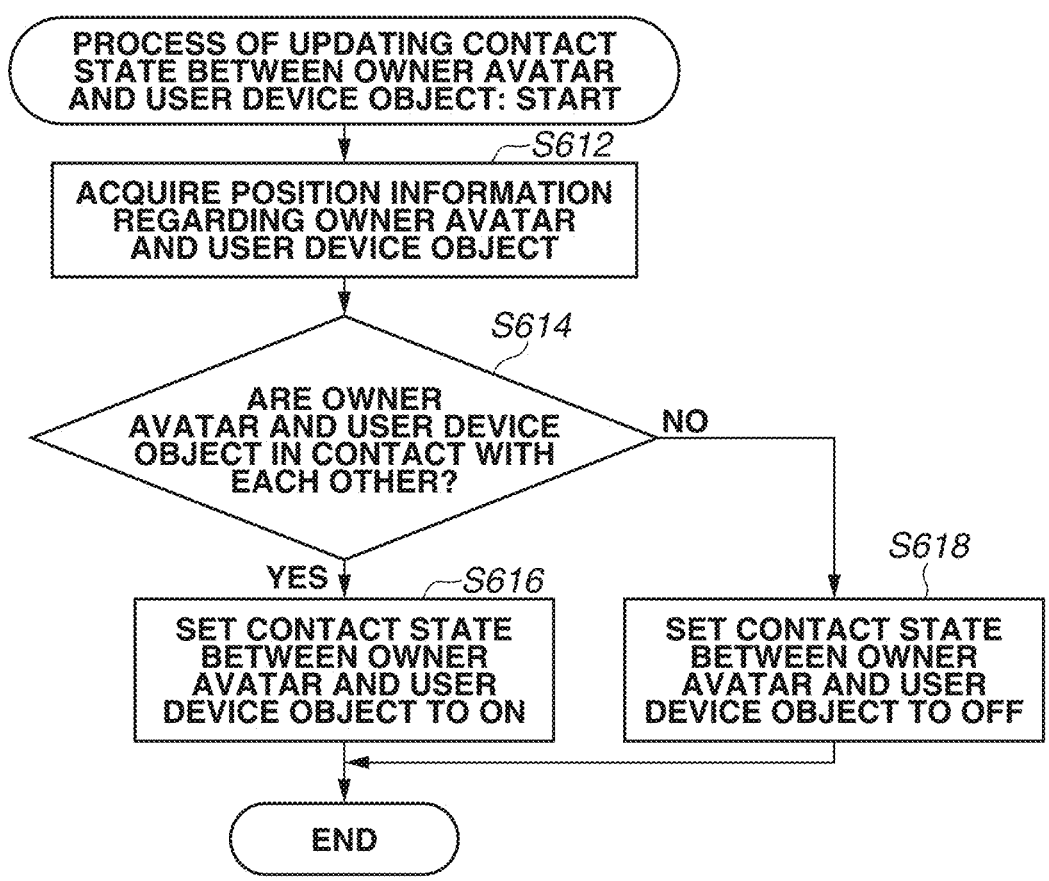

FIG. 5 is a diagram illustrating an example of a sequence until an owner of a private content (hereinafter referred to as an "owner") shares the content with an avatar of another user (hereinafter referred to as a "non-owner"). Each of FIGS. 6A to 6C is a flowchart illustrating a process in the sequence in FIG. 5.

Figure 4B:
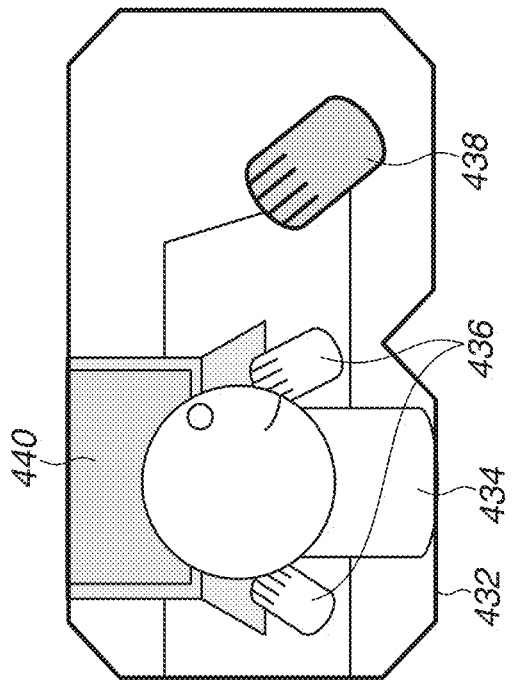
FIGS. 4A to 4D are diagrams illustrating an example of a gesture for sharing a personal computer (PC) screen brought into a virtual space.
Figure 4D:
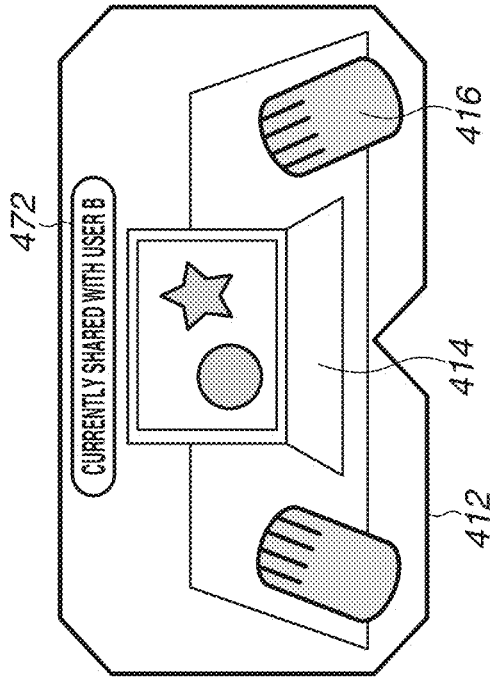
Figure 4A:
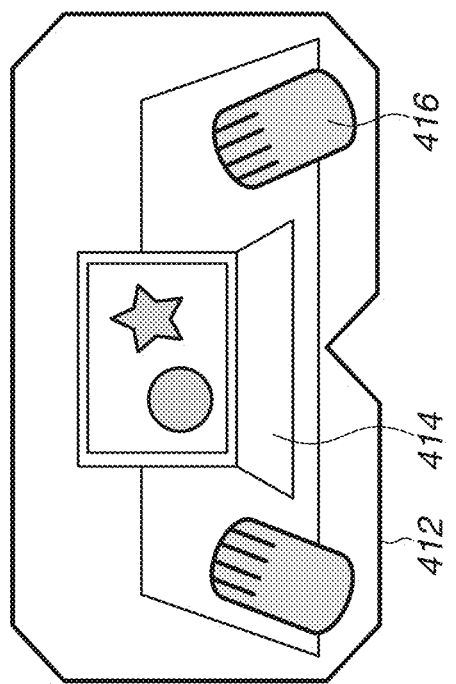
Figure 4C:
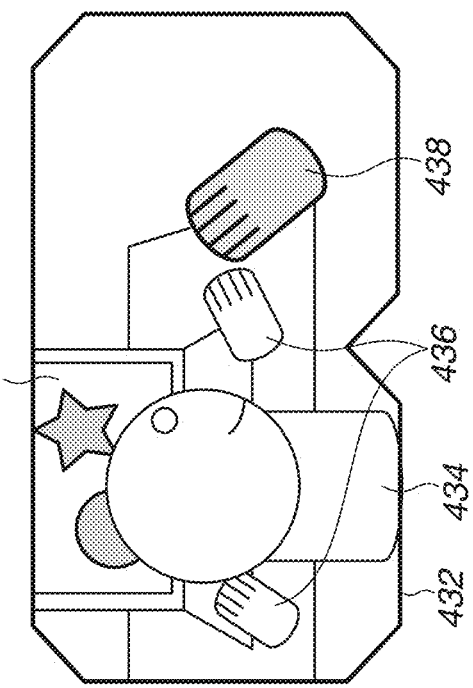

In the present exemplary embodiment, the owner operates the client terminal 121 (HMD) and the user device 122 (PC) and is a user corresponding to a user A in the "user ID" columns in tables 1, 2, and 4. FIGS. 4A and 4D illustrate videos displayed on the display 206 of the client terminal 121 of the owner. In contrast, the non-owner operates the client terminal 131 (HMD) and is a user corresponding to a user B in the "user ID" columns in tables 1, 2, and 4. FIGS. 4B and 4C illustrate videos displayed on the display 206 of the client terminal 131 of the non-owner.

FIG. 4A illustrates a video of the inside of the virtual space viewed from the owner's viewpoint as described above. A view 412 indicates the display 206 of the client terminal 121. A virtual object 414 is a user device object of the owner corresponding to the user device 122 brought into the virtual space. Since FIG. 4A illustrates the video viewed from the owner's viewpoint, the private content is displayed on the virtual object 414 as the user device object. A virtual object 416 is a virtual object representing the fingers of an owner avatar in the virtual space and is synchronous with the actions of the fingers of the owner in the real space.

FIG. 4B illustrates a video of the inside of the virtual space viewed from the non-owner's viewpoint. A view 432 indicates the display 206 of the client terminal 131. An avatar 434 is an avatar of the user A as the owner. A virtual object 436 is a virtual object representing the fingers of the avatar 434. A virtual object 438 is a virtual object representing the fingers of the user B as the non-owner, and similarly to FIG. 4A, is synchronous with the actions of the fingers of the non-owner in the real space. A virtual object 440 is a user device object of the owner corresponding to the user device 122 brought into the virtual space by the owner. At this stage, the non-owner can see the virtual object 440 itself as the user device object, but cannot see the private content displayed on the virtual object 440 from the non-owner's viewpoint.

FIG. 4C illustrates a video of the inside of the virtual space viewed from the non-owner's viewpoint. In FIG. 4C, the virtual object 436 (left hand) of the owner avatar 434 is in contact with the virtual object 414 as the user device object. The virtual object 436 (right hand) of the owner avatar 434 is also in contact with the virtual object 438 as the fingers of the non-owner avatar. In the present exemplary embodiment, the sharing of the private content is permitted under the condition that the owner avatar 434 touches the user device object displaying the private content that the owner wishes to share, and touches the non-owner avatar as a sharer. The processing contents of a contact determination for determining contact with a virtual object and a sharing permission determination will be described with reference to flowcharts illustrated in FIGS. 6A to 6C. After the sharing is permitted, the private content is displayed on the virtual object 414 as the user device object even from the non-owner's viewpoint in FIG. 4C.

FIG. 4D is a diagram illustrating a video of the inside of the virtual space viewed from the owner's viewpoint and a video after the sharing of the private content is permitted as described with reference to FIG. 4C. A virtual object 472 indicates that the private content is shared with the user B as the non-owner avatar.

An overall processing sequence will now be described with reference to FIG. 5.

In step S502, the login unit 384 of the user device 122 (PC) of the user A as the owner of the private content transmits a user ID and a password to the login processing unit 314. In step S504, the login processing unit 314 confirms whether the user ID and the password of the user A managed by the user management unit 312 match the transmitted user ID and password. If the user IDs and the passwords match each other, the login processing unit 314 returns a login result indicating that the login is successful. Similarly in step S506, the login unit 354 of the client terminal 121 (HMD) of the user A transmits a user ID and a password to the login processing unit 314. In step S508, the login processing unit 314 confirms whether the user ID and the password of the user A managed by the user management unit 312 match the transmitted user ID and password. If the user IDs and the passwords match each other, the login processing unit 314 returns a login result indicating that the login is successful. In steps S502 and S506, the same user ID is used.

In step S510, the content transmission unit 386 of the user device 122 transmits the private content displayed on the PC screen to the content reception unit 328. At this time, the private content transmitted to the content reception unit 328 is managed with an ID indicated by the "object ID" column in table 1 as its identifier by the content management unit 326. In step S512, the content reception unit 328 returns a response indicating that the reception of the private content is completed.

From this point onward, steps S510 and S512 are executed asynchronously with other steps and periodically.

In step S514, the content acquisition unit 366 of the client terminal 121 transmits a request to acquire the private content to the content provision unit 330. In step S516, the content provision unit 330 returns a response including data of the private content to the content acquisition unit 366. In step S518, the display unit 352 of the client terminal 121 displays the private content acquired in step S516 on the display 206 of the client terminal 121 as illustrated in FIG. 4A. From this point onward, steps S514 to S518 are executed asynchronously with other steps and periodically.

In step S522, the login unit 354 of the client terminal 131 (HMD) of the user B as the non-owner transmits a user ID and a password to the login processing unit 314. In step S524, the login processing unit 314 confirms whether the user ID and the password of the user B managed by the user management unit 312 match the transmitted user ID and password. If the user IDs and the passwords match each other, the login processing unit 314 returns a login result indicating that the login is successful. At this time, a video of the virtual space illustrated in FIG. 4B is displayed on the display 206 of the client terminal 131.

In steps S532 to S543, steps regarding operations on the avatars illustrated in FIG. 4C, a contact determination, and a sharing permission determination are executed asynchronously with other steps and periodically.

In step S532, the owner operates the fingers of the avatar from the client terminal 121. At this time, the local position information management unit 360 acquires position information regarding the fingers of the avatar of the user A based on the operation on the fingers, and the position information transmission unit 362 transmits the position information to the position information reception unit 322. As a result, the position information management unit 320 updates the position information regarding the user A illustrated in table 2. In step S534, the position information reception unit 322 returns a message indicating that the reception of the position information is completed to the position information transmission unit 362. In step S536, the sharing state management unit 332 determines whether the owner avatar and the user device object are in contact with each other. Hereinafter, the state of whether the owner avatar and the user device object are in contact with each other will be referred to as a "first contact state".

The specific processing content of step S536 will now be described with reference to a flowchart in FIG. 6A.

In step S612, the sharing state management unit 332 acquires the position information regarding the owner avatar and the user device object illustrated in tables 2 and 3 from the position information management unit 320. The processing then proceeds to step S614.

In step S614, the sharing state management unit 332 determines whether the owner avatar and the user device object are in contact with each other. Specifically, the sharing state management unit 332 determines whether the owner avatar and the user device object are in contact with each other, based on the coordinates of the avatars and the virtual objects acquired in step S612. If the sharing state management unit 332 determines in step S614 that the owner avatar and the user device object are in contact with each other (YES in step S614), the processing proceeds to step S616. If the sharing state management unit 332 determines that the owner avatar and the user device object are not in contact with each other (NO in step S614), the processing proceeds to step S618. In step S616, the sharing state management unit 332 sets the contact state between the owner avatar and the user device object (the first contact state) illustrated in table 4 to a contact state (on), and the processing ends. In contrast, in step S618, the sharing state management unit 332 sets the contact state between the owner avatar and the user device object (the first contact state) illustrated in table 4 to a non-contact state (off), and the processing ends.

In step S538, the non-owner operates the fingers of the avatar from the client terminal 131. At this time, the local position information management unit 360 acquires position information regarding the fingers of the avatar of the user B based on the operation on the fingers, and the position information transmission unit 362 transmits the position information to the position information reception unit 322. As a result, the position information management unit 320 updates the position information regarding the user B illustrated in table 2. In step S540, the position information reception unit 322 returns a message indicating that the reception of the position information is completed to the position information transmission unit 362. In step S542, the sharing state management unit 332 determines whether the avatars are in contact with each other.

Hereinafter, the state of whether the avatars are in contact with each other will be referred to as a "second contact state". The specific processing content of step S542 will now be described with reference to a flowchart in FIG. 6B.

In step S632, the sharing state management unit 332 acquires the position information regarding the avatars illustrated in table 2 from the position information management unit 320, and the processing proceeds to step S634. In step S634, the sharing state management unit 332 determines the contact state between the avatars and updates the "contact user" column in table 4, and then, the processing ends. Similarly to step S614, the determination of the contact state is made based on the coordinates of the avatars. In the present exemplary embodiment, the main coordinates, the left hand coordinates, and the right hand coordinates are defined regarding each avatar. If the coordinates of any parts of the avatars are in proximity to each other, the sharing state management unit 332 determines that the avatars as the targets are in contact with each other.

In step S543, the sharing state management unit 332 makes a sharing permission determination regarding whether to permit the non-owner to share the private content of the owner. The specific processing content of step S543 will now be described with reference to FIG. 6C.

In step S652, the sharing state management unit 332 acquires the contact states from the sharing state management table illustrated in table 4, and the processing proceeds to step S654. In step S654, the sharing state management unit 332 makes the sharing permission determination based on the first and second contact states in the contact states acquired in step S652. Specifically, the sharing state management unit 332 confirms whether the first contact state is on and there are avatars in the relationship of the second contact state. If the condition is satisfied (YES in step S654), the processing proceeds to step S656. If the condition is not satisfied (NO in step S654), the processing ends. In the example of table 4, regarding the user A, the "contact with user device object" column (the first contact state) is on, and the user B is present as a contact user in the "contact user" column (the second contact state). Thus, the sharing state management unit 332 determines in step S654 that the condition is satisfied. In step S656, the sharing state management unit 332 enables the sharing state of the private content for the non-owner avatar in the relationship of the second contact state.

In the example of table 4, the non-owner avatar in the relationship of the second contact state is the user B, and thus the sharing state management unit 332 sets the user B in the "sharer user" column regarding the user A in table 4 and permits the user B to share the private content.

Steps S544 to S550 are processes performed between the client terminal 131 of the user B as the non-owner and the virtual space management system 111, and are executed asynchronously with other steps and periodically.

In step S544, the sharing state acquisition unit 368 of the client terminal 131 makes a request to acquire a list of object IDs associated with private contents in sharing states to the sharing state provision unit 334. In step S545, the sharing state provision unit 334 references the "sharer user" column in table 4, and if the user having made the request in step S544 is included in the sharers, the sharing state provision unit 334 acquires the object IDs of the owners from the "object ID" column in table 1. The sharing state provision unit 334 then returns a list of the object IDs of all the owners to the sharing state acquisition unit 368 of the client terminal 131. In step S546, the content acquisition unit 366 of the client terminal 131 transmits a request to acquire private contents associated with the object IDs acquired in step S545 to the content provision unit 330. In step S548, the content provision unit 330 references the sharing state management table in table 4 managed by the sharing state management unit 332. If the user having made the request is permitted to share a private content, the content provision unit 330 returns the private content to the content acquisition unit 366. In the example of table 4, the user B is permitted to share a private content as a sharer user, and therefore, the content acquisition unit 366 of the client terminal 131 can acquire the private content.

In step S550, the display unit 352 of the client terminal 131 displays the user device object including the private content acquired in step S548 on the display 206 of the client terminal 131 (the state of FIG. 4C). If the sharing state acquisition unit 368 of the client terminal 131 acquires a plurality of object IDs in step S545, the content acquisition unit 366 of the client terminal 131 can acquire a plurality of private contents in step S548. In this case, in step S550, the display unit 352 of the client terminal 131 can display the user device object including the plurality of private contents acquired in step S548 on the display 206 of the client terminal 131.

Steps S552 to S556 are processes performed between the client terminal 121 of the user A as the owner and the virtual space management system 111 and are executed asynchronously with other steps and periodically.

In step S552, the sharing state acquisition unit 368 of the client terminal 121 makes a request to acquire the sharing state to the sharing state provision unit 334. In step S554, the sharing state provision unit 334 returns data of the sharing state illustrated in table 4 to the sharing state acquisition unit 368 of the client terminal 121. In step S556, the display unit 352 of the client terminal 121 displays the sharer user of the private content as in the virtual object 472 in FIG. 4D on the display 206 based on the acquired sharing state.

As described above, in the present exemplary embodiment, a description has been given of a method for, based on contact with an avatar or a virtual object in the virtual space, determining whether to permit the sharing of a private content. By using this method, it is possible to share a private content by only performing a simple gesture on a particular avatar near an avatar of a user in the virtual space.

In the present exemplary embodiment, it is determined whether to permit the sharing of a private content under the condition that avatars are in contact with each other. Alternatively, a method using a different gesture can also be used so long as the method can identify a user device object on which a private content to be shared is displayed and a sharer avatar.

For example, a method can be used for assigning information indicating the directions to a user device object and avatars in addition to the coordinates, and permitting the non-owner avatar to share a private content if the user device object and a non-owner avatar face each other within a predetermined distance. Alternatively, a method can be used for permitting the non-owner avatar to share a private content if an owner avatar and a non-owner avatar face each other within a predetermined distance. Thus, the present disclosure is not limited to the method for sharing a private content based on contact that is described in the present exemplary embodiment, and it is also possible to share a private content on the condition of the positional relationship between a user device object and an avatar or the gestures of avatars.

It is also possible to share a private content based on an operation other than the gesture of an avatar in the virtual space. For example, the owner notifies the non-owner of an ID obtained by adding a signature to an object ID that can be acquired according to a request equivalent to that in step S545 outside the virtual space in advance. Then, the content acquisition unit 366 of the client terminal 131 of the non-owner includes this ID in a request and executes step S546 in the virtual space. In step S548, the content provision unit 330 verifies the ID with the signature. If the signature is correct, the content provision unit 330 returns a private content to the content acquisition unit 366. In this manner, the content acquisition unit 366 of the client terminal 131 of the non-owner can acquire a private content from the content provision unit 330 without the gesture of an avatar in the virtual space.

The owner of the private content can also bring the user device 122 into the virtual space in a mode where the private content is not shared. In this case, the sharing state management unit 332 controls another avatar not to share the private content even if the condition for the sharing permission determination described in the present exemplary embodiment is satisfied.

In terms of usability, it is desirable that a private content that has entered a sharing state once should continue the sharing state even if the contact state between the avatars is cancelled. The owner, however, may also explicitly forget to cancel the sharing state. Taking such a case into account, an example of a method for cancelling the sharing state will now be described with reference to FIGS. 7A and 7B.

Figure 7A:
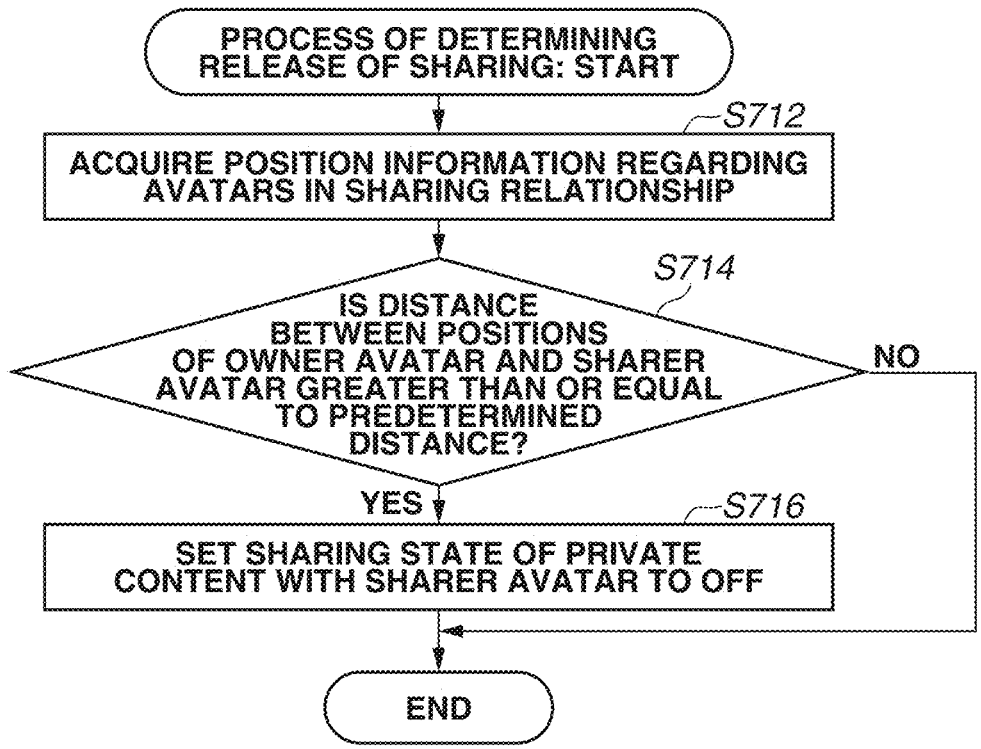
FIGS. 7A and 7B are flowcharts for determining whether to cancel the sharing of the PC screen brought into the virtual space.
Figure 7B:
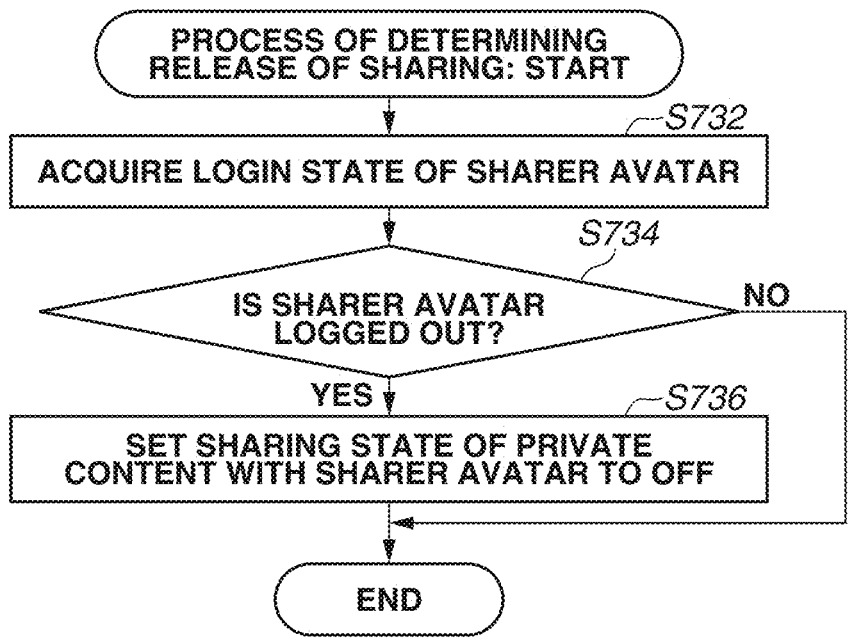

Each of FIGS. 7A and 7B is a flowchart illustrating a process for cancelling the sharing state of a private content. Steps in FIGS. 7A and 7B are executed asynchronously with the steps in the sequence diagram in FIG. 5 and periodically.

FIG. 7A illustrates a method for determining the cancellation of the sharing state according to the distance between the owner avatar and the non-owner avatar in the virtual space.

In step S712, the sharing state management unit 332 acquires position information regarding avatars in a sharing relationship based on the data in tables 2 and 4. In the present exemplary embodiment, the users A and B are in a sharing relationship, and thus the sharing state management unit 332 acquires position information regarding the avatars of the users A and B. The processing proceeds to step S714.

In step S714, the sharing state management unit 332 determines whether the distance between the positions of the owner avatar and the sharer avatar is greater than or equal to a predetermined distance. If it is determined that the distance is greater than or equal to the predetermined distance (YES in step S714), the processing proceeds to step S716. If it is determined that the distance is not greater than or equal to the predetermined distance (NO in step S714), the processing ends. The predetermined distance is any threshold set by the virtual space management system 111. The sharing state management unit 332 can calculate the distance between the avatars from the coordinate values in the "main coordinates" column of the avatars in table 2, compare the calculated distance with the threshold, and determine whether the distance is greater than or equal to the predetermined distance. Alternatively, the sharing state management unit 332 can also reference, for example, the "space ID" column in table 2, and determine whether the distance is greater than or equal to the predetermined distance based on the difference between the space IDs, instead of a numerical value such as a distance. In step S716, the sharing state management unit 332 sets the sharing state of the private content with the sharer avatar to off, and the processing ends. By the step S716, a provision of the private content to the sharer avatar is restricted.

FIG. 7B illustrates a method for determining the cancellation of the sharing state according to the login state of the sharer user.

In step S732, the sharing state management unit 332 acquires the login state of the sharer avatar using the data in tables 1 and 4, and the processing proceeds to step S734. In step S734, the sharing state management unit 332 determines whether the sharer avatar is logged out, based on the login state of the sharer avatar acquired in step S732. If the sharer avatar is logged out (YES in step S734), the processing proceeds to step S736. If the sharer avatar is not logged out (NO in step S734), the processing ends. In step S736, the sharing state management unit 332 sets the sharing state of the private content with the sharer avatar to off, and the processing ends.

As described above, it is also possible to automatically cancel the sharing state of a private content according to the positional relationship between avatars in the virtual space or the login state of an avatar. The methods for cancelling the sharing state in FIGS. 7A and 7B are merely examples, and the present disclosure is not limited to these methods.

A description has been given of a sharing method in the case of two users, namely an owner of a private content and a non-owner, in the first exemplary embodiment. However, a case is also possible where a user wishes to share a private content with a plurality of avatars near an avatar of the user in the virtual space by performing a single action. In a second exemplary embodiment, a description will be given of a method for sharing a private content with a plurality of avatars by performing a single action.

In the second exemplary embodiment, a user C is also newly treated as a non-owner avatar in addition to treating the user A who is an owner of a private content as an owner avatar and treating the user B as a non-owner avatar similarly to the first exemplary embodiment. Tables 1', 2', and 4' obtained by modifying the data in tables 1, 2, and 4 described in the first exemplary embodiment are illustrated below.

TABLE 1'

User Management Table

| User ID | Password | Login state | Login expiration date | Object ID |
|---|---|---|---|---|
| user A | ********** | on | 2022 Dec. 31 0:00 | private A |
| user B | ********** | on | 2022 Dec. 31 0:00 | |
| user C | ********** | on | 2022 Dec. 31 0:00 | |

TABLE 2'

Avatar Position Information Management Table

| User ID | Space ID | Main coordinates | Left hand coordinates | Right hand coordinates |
|---|---|---|---|---|
| user A | room A | (100, 100, 5) | (100, 98, 5) | (100, 102, 5) |
| user B | room A | (100, 104, 5) | (100, 102, 5) | (100, 106, 5) |
| user C | room A | (100, 108, 5) | (100, 106, 5) | (100, 110, 5) |

TABLE 4'

Sharing State Management Table

| User ID | Contact with user device object | Contact user | Sharer user |
|---|---|---|---|
| user A | on | user B, user C (indirect) | user B, user C |
| user B | | user A, user C | |
| user C | | user B, user A (indirect) | |

Although the contents indicated in the respective columns are similar to those in the first exemplary embodiment, the concept of an indirect contact user is further added to the "contact user" column in table 4'. An "indirect contact user" refers to a user who is not in direct contact with a user, but is in indirect contact with the user via another avatar. A description will now be given with reference to FIGS. 8A to 8C.

FIG. 8A illustrates a video of the virtual space viewed from the client terminal 131 corresponding to one of the non-owner avatars and a diagram obtained by adding an avatar 812 to FIG. 4C. In FIG. 8A, an avatar 434 corresponds to the user A, an avatar 812 corresponds to the user B, and an avatar having a virtual object 438 (fingers) corresponds to the user C. The avatar 812 is in contact with the avatar 434 as the owner avatar. In contrast, the avatar having the virtual object 438 is in contact with the avatar 812, but is not in contact with the avatar 434. In the second exemplary embodiment, the sharing state management unit 332 determines that the avatar having the virtual object 438 is in indirect contact with the avatar 434 via the avatar 812. Then, the sharing state management unit 332 adds the avatar having the virtual object 438 as an indirect contact user to the "contact user" column in table 4'.

FIG. 8B is a diagram illustrating a video of the virtual space viewed from the client terminal 121 corresponding to the owner avatar (the user A) in a case where the user C as the indirect contact user is brought into a sharing state as a sharer user. A virtual object 832 is a virtual object similar to the virtual object 472 in the first exemplary embodiment, and in the second exemplary embodiment, indicates that the users B and C are in a sharing state as sharer users.

FIG. 8C is a flowchart obtained by adding the determination of an indirect contact user to the flowchart in FIG. 6B.

In step S852, the sharing state management unit 332 acquires the position information regarding the avatars similarly to step S632, and the processing proceeds to step S854. In step S854, the sharing state management unit 332 updates the contact states between the avatars (the second contact states), and the processing proceeds to step S856.

In step S856, the sharing state management unit 332 determines whether there are avatars in an indirect contact state. If there are avatars in an indirect contact state (YES in step S856), the processing proceeds to step S858. If there are not avatars in an indirect contact state (NO in step S856), the processing ends. In the determination of indirect contact made by the sharing state management unit 332, since the coordinates of the avatars can also be obtained from table 2' similarly to the method described in the first exemplary embodiment, the sharing state management unit 332 firstly extracts avatars in direct contact with each other.

Thereafter, the sharing state management unit 332 tracks the avatars in direct contact with each other and thereby can determine whether there are avatars in indirect contact with each other. In step S858, the sharing state management unit 332 reflects on table 4' the contact state (the second contact state) between the avatars in indirect contact with each other extracted in step S856.

By using the above method, it is possible to share a private content with the non-owner avatars by performing a single action even if there is a plurality of non-owner avatars.

The present disclosure also includes an apparatus or a system and a method configured by appropriately combining the above exemplary embodiments.

The present disclosure includes an apparatus or a system that executes one or more pieces of software (programs) for achieving the functions of the above exemplary embodiments. The present disclosure also includes a method for achieving the above exemplary embodiments that is executed by the apparatus or the system. The program is supplied to the apparatus or the system via a network or various storage media, loaded into one or more memories by one or more computers (CPUs or MPUs) of the apparatus or the system to be executed. That is, the present disclosure also includes the program itself or various computer-readable storage media that store the program. The present disclosure can also be achieved by a circuit (e.g., an application-specific integrated circuit (ASIC)) for achieving the functions of the above exemplary embodiments.

According to the present exemplary embodiment, it is possible to provide a mechanism for easily sharing a content displayed on a PC screen brought into a virtual space with a user present near a certain user in the virtual space.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-093565, filed Jun. 9, 2022, which is hereby incorporated by reference herein in its entirety.

What is claimed is:

1. A virtual space management system configured to manage a virtual space in which a plurality of users participates as avatars using client terminals, the virtual space management system comprising:
 a first provision unit configured to perform control to provide the virtual space via a client terminal of a first user and a client terminal of a second user; and
 a second provision unit configured to perform control to provide a virtual object in the virtual space,
 wherein the second provision unit is further configured to perform control to:
 provide, as the virtual object, a user device object corresponding to a device in physical space being used by the first user in the virtual space via the client terminal of the first user and the client terminal of the second user;
 provide, via the client terminal of the first user, private content of the first user in a display area of the user device object, the private content corresponding to content being displayed on a display of the device in physical space; and
 provide the private content in the display area of the user device object in virtual space to be visible by the second user via the client terminal of the second user based on at least one of a gesture of a first avatar of the first user on both the user device object in virtual space and a second avatar of the second user in the virtual space, and an operation by the second user in the virtual space.

2. The virtual space management system according to claim 1, wherein the second provision unit is further configured to perform control to provide the private content via the client terminal of the second user based on, as the gesture of the first avatar, contact of the first avatar with the user device object and the second avatar.

3. The virtual space management system according to claim 1, wherein the second provision unit further restricts to provide the private content via the client terminal of the second user according to a state where a distance between the first avatar and the second avatar in the virtual space is greater than a predetermined distance.

4. The virtual space management system according to claim 1, wherein the operation performed by the second user to provide the private content via the client terminal of the second user is a request for acquiring the private content using ID of the private content.

5. A method for a virtual space management system configured to manage a virtual space in which a plurality of users participates as avatars using client terminals, the method comprising:
 controlling provision, as first provision, of the virtual space via a client terminal of a first user and a client terminal of a second user; and
 controlling provision, as second provision, of a virtual object in the virtual space,
 wherein, in the second provision, control is further performed to:
 provide, as the virtual object, a user device corresponding to a device in physical space being used by the first user in the virtual space, via the client terminal of the first user and the client terminal of the second user;
 provide, via the client terminal of the first user, private content of the first user in a display area of the user device object, the private content corresponding to content being displayed on a display of the device in physical space; and
 provide the private content in the display area of the user device object in virtual space to be visible by the second user via the client terminal of the second user based on at least one of a gesture of a first avatar of the first user on both the user device object in virtual space and a second avatar of the second user in the virtual space, and an operation by the second user in the virtual space.

* * * * *